No. 693,408. Patented Feb. 18, 1902.
J. H. LAVOLLAY & G. E. BOURGOIN.
METHOD OF MANUFACTURING SUGAR.
(Application filed May 19, 1900.)
(No Model.)
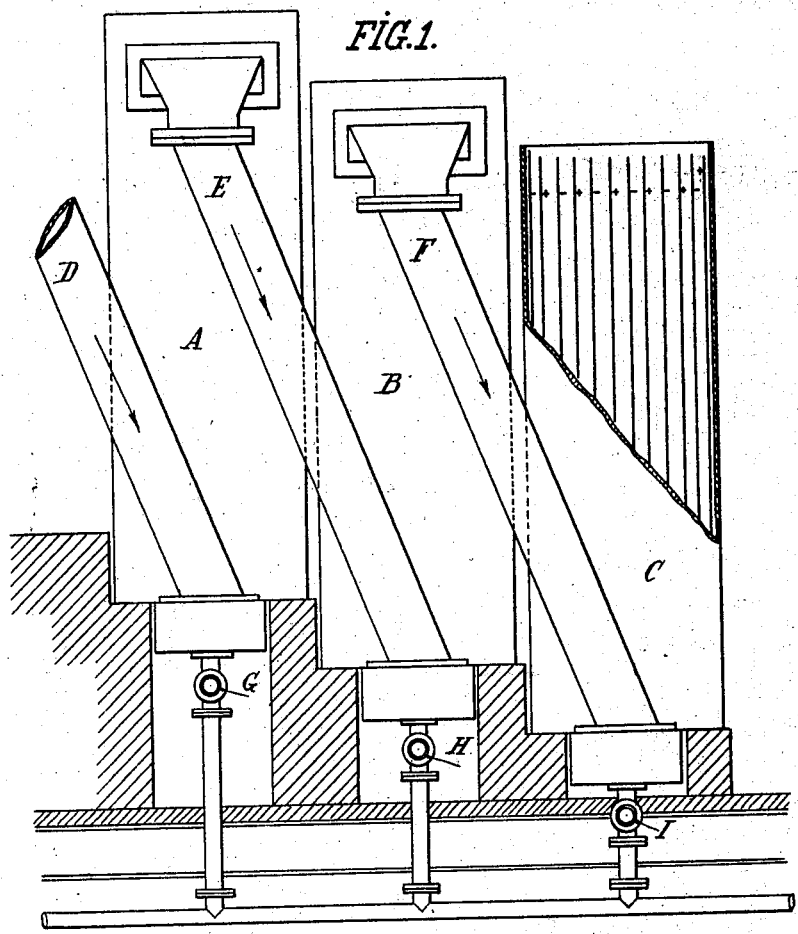
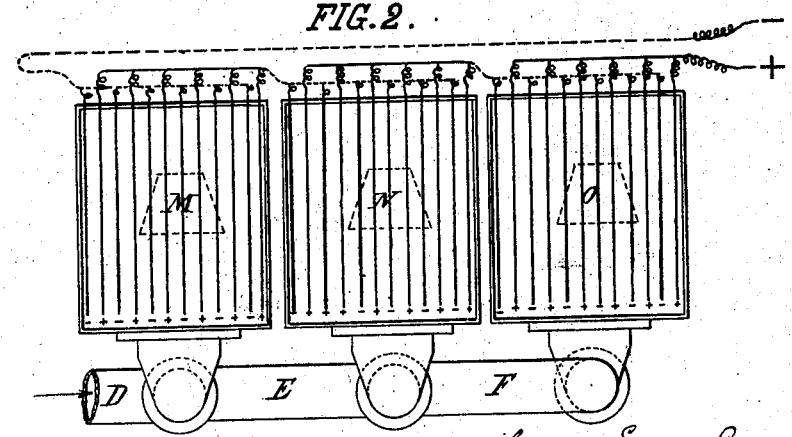

UNITED STATES PATENT OFFICE.

JULES HENRI LAVOLLAY AND GUSTAVE EUGÈNE BOURGOIN, OF PARIS, FRANCE.

METHOD OF MANUFACTURING SUGAR.

SPECIFICATION forming part of Letters Patent No. 693,408, dated February 18, 1902.

Application filed May 19, 1900. Serial No. 17,212. (No specimens.)

*To all whom it may concern:*

Be it known that we, JULES HENRI LAVOLLAY and GUSTAVE EUGÈNE BOURGOIN, citizens of the Republic of France, residing at Paris, in the Republic of France, (whose postal address is 3 Rue Froment, Paris,) have invented certain new and useful Improvements in Methods of Manufacturing Sugar, of which the following is a specification.

Our invention relates to a new process for purifying and decolorizing saccharine solutions which is applicable at any stage of the usual process of sugar manufacture and refinement.

While our process may be carried out by a variety of conceivable means, we have shown a preferred form of apparatus in the accompanying drawings, wherein—

Figure 1 is a side view, and Fig. 2 a top view of the same.

Our process consists, broadly, in subjecting the crude saccharine solution to the simultaneous action of electric current and a mixture of a manganate of an alkaline-earth metal with calcium fluorid. This mixture is insoluble and should therefore be kept in suspension by appropriate means during the process.

Generally considered, our process is carried on as follows: The juices to be treated are heated to from 70° to 80° centigrade and mixed with powdered calcium fluorid and a manganate of an alkali-earth metal, preferably calcium manganate. The proportions will of course vary somewhat, as the quality of the crude solution varies; but a good average is from twenty to fifty grams of each material named for each hectoliter of juice. While these powders are in suspension in the syrup the whole is subjected to an electric current having a density of from one to five tenths of an ampere per square decimeter of electrode. This is kept up for from five to twenty minutes. Any suitable form of electrode may be used. The organic materials are thus precipitated, and the decolorizing process is completed by stirring in a carbonate of an alkali-earth metal, as barium carbonate.

The chemical reactions involved in this process cannot be precisely ascertained. The fact remains, however, that we have discovered the efficacy of the reagents named when used with an electric current, although, as is well known, neither the current alone nor the reagents alone will serve as decolorizing and purifying agents. The chemical action involved is probably as follows: The electric current acts to simultaneously decompose the water and the salt of calcium, acting to thus peroxidize the manganate. The resulting salt, being highly unstable, decomposes and acts to oxidize and destroy the impurities in the syrup. While we indicate this as the probable action, we are not to be considered as bound to this theory as explaining our process.

A type of the apparatus preferably employed by us is shown in the drawings, wherein—

A, B, and C are the first three of a series of any desired number of vertically-disposed vessels. In each vessel there are placed parallel electrode-plates of any desired metal—as, for instance, zinc. These are arranged alternately positive and negative, and they are indicated in the vessel C in Fig. 1 and in all three vessels in Fig. 2 by the signs plus and minus. These electrodes may be connected in circuit in any desired way; but we prefer, as shown, to have them arranged in series throughout the successive vessels and in multiple in each vessel. (See Fig. 2.)

At D, E, and F are shown induction-pipes, the arrows thereon indicating the direction of flow of the juices therein. At G, H, and I are shown outlet-valves for the cleaning out of the vessels A, B, and C at desired intervals.

The hot juices, mixed with the powdered materials, as heretofore described, flow through the induction-tube D and, passing under the vessel A, enter by the aperture M. Rising in the vessel A the juices pass between the electrodes and by reason of their continuous upward movement keep the powdered materials in suspension, thus insuring simultaneous action of these materials and of the electric current. When the juices reach the top of the vessel A, they pass into the tube E and downward and through the aperture N into the bottom of the vessel B. From this vessel the juices pass down again through the pipe F and upward through the aperture O and vessel C. This continued upward movement of the juices between electrodes maintains the suspension of the powdered materials, and it is continued through as many vessels as may be necessary, depending upon the size of the vessels, the speed of circulation of the juices, and their chemical nature. Not more than a maximum density of one ampere of current per square decimeter should be allowed to pass. The voltage applied to the electrodes is determined by the desired current and the internal resistance in the vessels.

After the treatment above described complete decolorization of the juices is attained by stirring well into them a carbonate of an alkali-earth metal, barium carbonate being preferred for this purpose.

What we claim is—

1. The method of purifying saccharine juices which consists in maintaining in suspension therein a powdered mixture of a manganate of an alkali-earth metal and calcium fluorid and simultaneously passing an electric current therethrough.

2. The method of purifying saccharine juices which consists in maintaining in suspension therein a powdered mixture of a manganate of an alkali-earth metal and calcium fluorid, simultaneously passing an electric current therethrough and finally stirring through the mass so treated a powdered carbonate of an alkali-earth metal.

In witness whereof we have hereunto signed our names, this 28th day of April, 1900, in the presence of two subscribing witnesses.

JULES HENRI LAVOLLAY.
GUSTAVE EUGÈNE BOURGOIN.

Witnesses:
AUGUSTE FOURNOL,
PAUL FOURNOL.